US005545264A

United States Patent [19]
Hashimoto

[11] Patent Number: 5,545,264
[45] Date of Patent: Aug. 13, 1996

[54] METHOD OF AND APPARATUS FOR PROCESSING METAL MATERIAL

[75] Inventor: Yotaro Hashimoto, Shiga-ken, Japan

[73] Assignee: Eiwa Co., Ltd., Kurita-gun, Japan

[21] Appl. No.: 383,484

[22] Filed: Feb. 2, 1995

[30] Foreign Application Priority Data

| Apr. 26, 1994 | [JP] | Japan | 6-088915 |
| Dec. 9, 1994 | [JP] | Japan | 6-306236 |
| Dec. 15, 1994 | [JP] | Japan | 6-311923 |
| Jan. 10, 1995 | [JP] | Japan | 7-001624 |

[51] Int. Cl.$^6$ ............................................. C23C 8/18
[52] U.S. Cl. .......................... 148/283; 148/287; 148/249
[58] Field of Search ............................. 148/283, 287, 148/249, 105, 122

[56] References Cited

U.S. PATENT DOCUMENTS 2,543,710   2/1951   Schimdt et al. .

FOREIGN PATENT DOCUMENTS

| 4-184903 | 7/1992 | Japan . |
| 5-32421 | 2/1993 | Japan . |
| 6-150813 | 5/1994 | Japan . |
| 6-143490 | 5/1994 | Japan . |
| 6-264256 | 9/1994 | Japan . |

*Primary Examiner*—Sam Silverberg
*Attorney, Agent, or Firm*—Sterne, Kessler, Goldstein & Fox P.L.L.C.

[57] ABSTRACT

The invention relates to a method and apparatus for processing a metal material. In the present invention, a chlorine hydrocarbon solution, water and surfactant solution are mixed together. As an alternative to chlorine hydrocarbon solution, methylene chloride solution may be used. The mixture solution is heated to generate chlorine hydrocarbon gas, water vapor or steam and surfactant gas. The gas mixture fills a hermetically sealed processing tank and permeates a metal material, particularly, a steel material or iron powder disposed in the processing tank. Thus, impurities in open areas of crystal cells of the metal material are dissolved and removed. Then an indissoluble film composed of anticorrosive rust is formed on the surface of the metal material. Where the metal material is steel or iron powder, the anticorrosive rust primarily comprises triiron tetroxide ($Fe_3O_4$). To produce magnetic material by the process of the present invention, iron material such as iron powder is converted into triiron tetroxide ($Fe_3O_4$), namely magnetite, or diiron trioxide ($\gamma\text{-}Fe_2O_3$), namely maghemite.

20 Claims, 7 Drawing Sheets

| OPEN OR CLOSE VALVE / OPERATING STEP | 1 | 2 | 3 | 4 | 5 | 6 | 7 | 8 | 9 | 10 | 11 | 12 | 13 | VACUUM PUMP |
|---|---|---|---|---|---|---|---|---|---|---|---|---|---|---|
| DEAERATION | + | − | + | − | − | − | − | − | − | − | − | − | − | ON |
| FEED OF MIXTURE SOLUTION | − | − | − | + | − | − | − | − | − | − | − | − | − | OFF |
| PROCEEDING OF IRON MATERIAL | − | − | − | − | − | − | + | + | + | − | − | − | − | OFF |
| COOLING OF MIXTURE SOLUTION | − | + | − | − | + | + | − | − | − | + | − | − | − | OFF |
| RETURN OF MIXTURE SOLUTION TO TANK | + | − | + | − | − | − | − | − | − | − | − | + | + | OFF |
| RECOVERY OF MIXTURE SOLUTION GAS | − | − | − | − | − | − | − | − | − | − | + | − | − | ON |
| RECOVERY OF MIXTURE SOLUTION IN CONDENSER | − | + | − | − | − | − | − | − | − | − | − | − | − | OFF |

FIG. 2

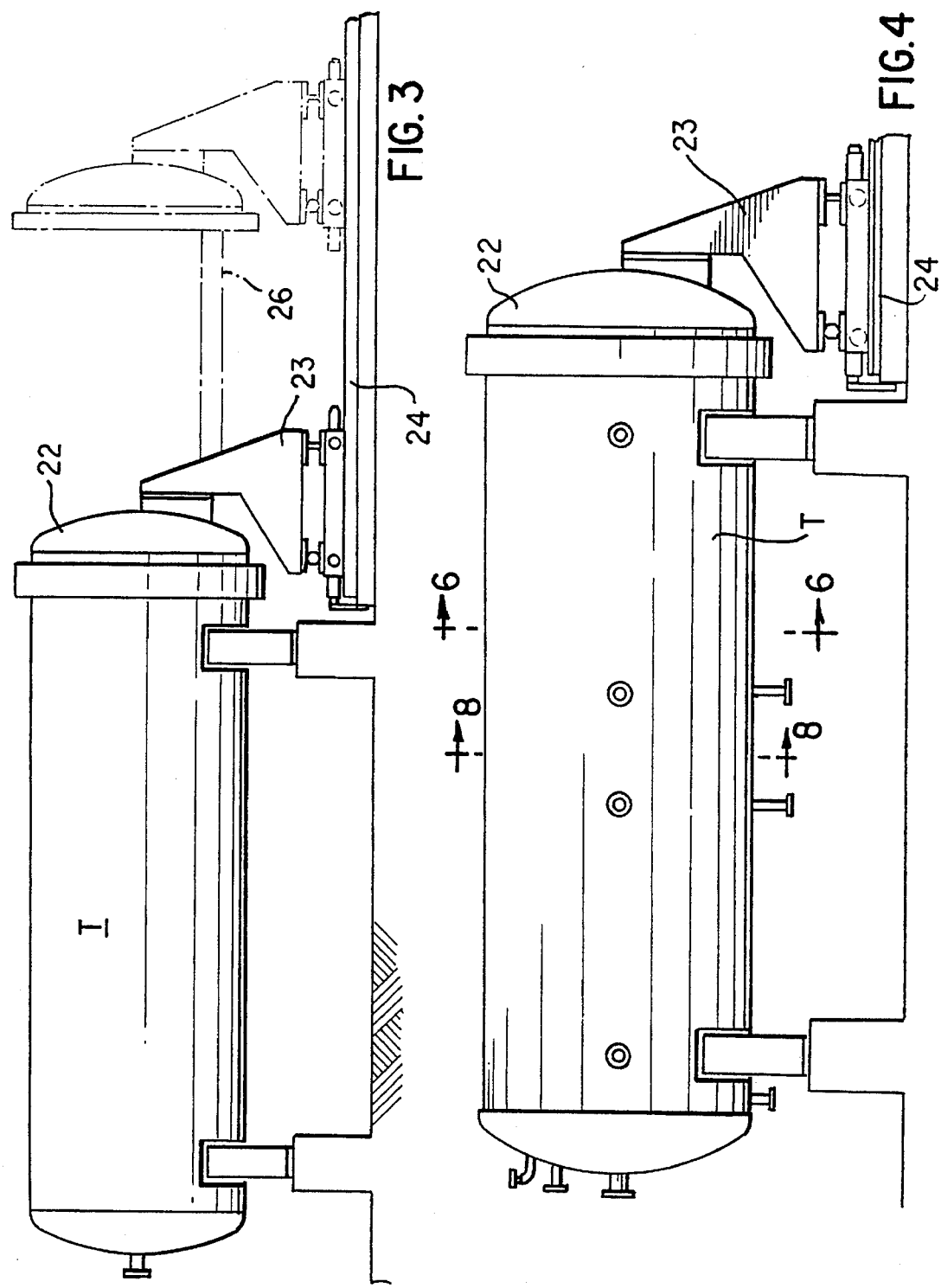

19-629 Fe$_3$O$_4$
R=0.870

29-713 FeO(OH)
R=0.170

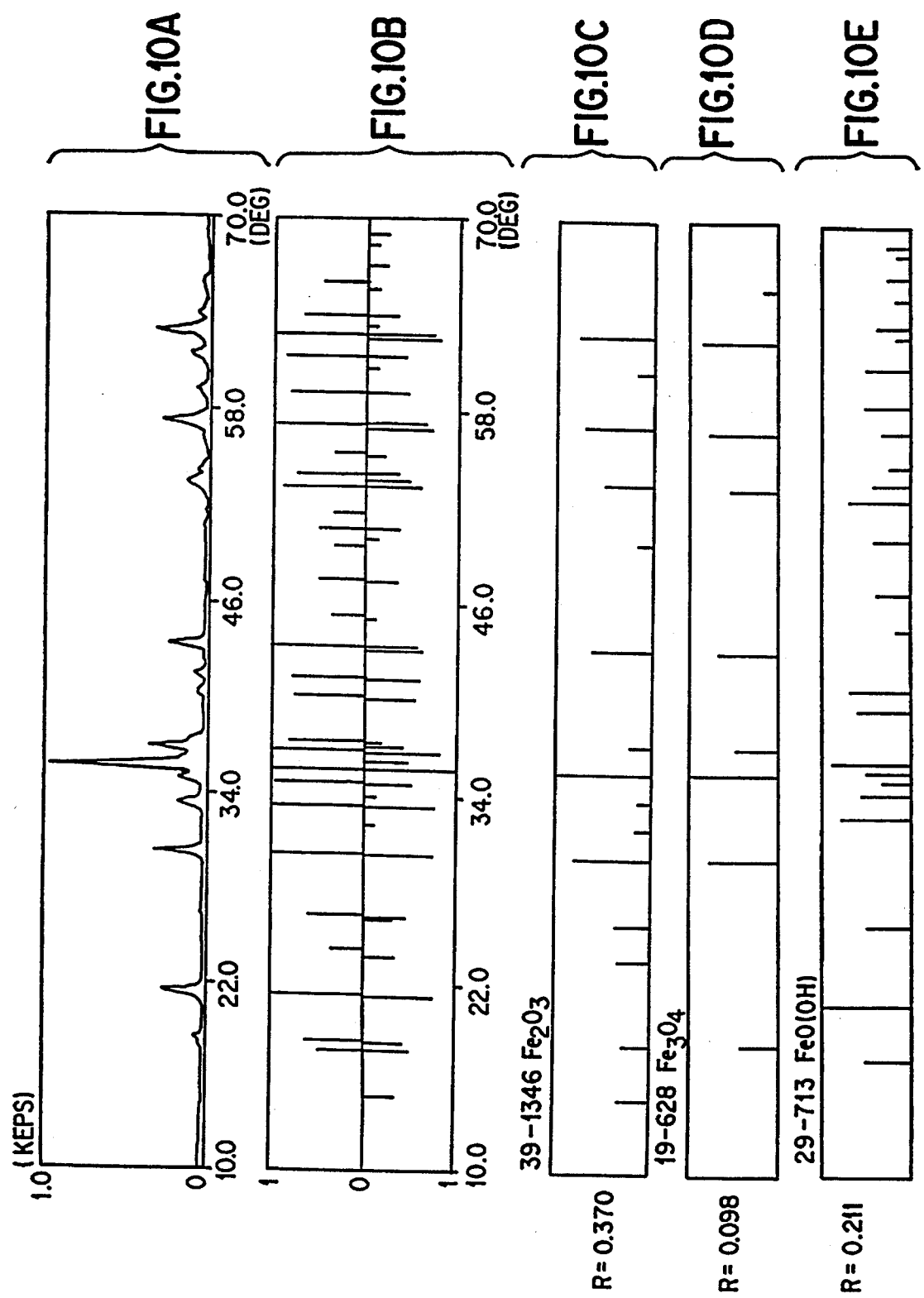

METHOD OF AND APPARATUS FOR PROCESSING METAL MATERIAL

BACKGROUND OF THE INVENTION

1. Field of the Invention

This invention relates to a method of and an apparatus for producing metals with improved corrosion resistance. More particularly, the invention relates to a method of and an apparatus for producing steel and iron powder with improved corrosion resistance. In addition, this invention relates to a method and apparatus for processing iron powder to produce a magnetic substance.

2. Description of Related Art

Conventionally, attempts have been made to produce metals that are resistant to corrosion and climatic conditions, such as precipitation and humidity. For example, small amounts of rust have been allowed to form on a surface of the metal in an attempt to form a protective layer or barrier on the metal. In addition, metals have been coated with a magnetic substance to resist corrosion. Also, anticorrosion paints have been developed for being painted on the surface of the metal to protect the metal from corrosion. However, the following disadvantages are associated with above conventional techniques.

In particular, the protective layer or barrier of rust discussed above, may be produced by exposing the metal to the atmosphere. This type of rust is produced when the metal is exposed to rain or water and is called red rust. If the metal includes iron, for example, the particular type of red rust produced is lepidocrocite($\gamma$-FeOOH) and goethite ($\alpha$-FeOOH). When this red rust dries, it changes into a black rust. The particular type of black rust produced primarily comprises triiron tetroxide ($Fe_3O_4$), namely magnetite. However, the types of rusts discussed above and produced in the manner discussed above are large crystals rusts. Repeated wetting and drying of the metal causes the large crystal rusts to gradually spread and erode the metal. Naturally, as the rust continues to corrode the metal it becomes weaker.

Japanese Patent Provisional Publication No. 6-264256 discloses painting steel with an anticorrosion paint in a series of stages over a month long period. However, this is time consuming and extremely expensive. Moreover, with the use of an anticorrosion paint, additional work and time are necessary to paint an intricate product or the interior of a hollow tube, for example.

In addition, Japanese Patent Provisional Publication No. 6-143490 discloses painting the surface of steel material with paint mixed with triiron tetroxide. However, as discussed above, it proves to be impracticable to paint certain structures. For example, it is especially difficult to paint a welded structure, an electrically welded tube or a seamless tube.

Japanese Patent Provisional Publication No. 6-150813 discloses forming an indissoluble film on a mask frame for a shadow mask of a cathode-ray tube. However, to produce the indissoluble film, the mask frame must be processed in oxidizable air heated between 550° C. and 650° C. Therefore, it is impossible to use this process on a typical steel construction, for example, an electric welded tube, a seamless tube or a bent tube. Furthermore, to process, a magnetic material, for example, from iron powder by this process would be expensive because the iron powder would need to be heated to at least 600° C. or higher and must be processed in the oxidizable air for an extended period of time. Specifically, the particular types of magnetic materials considered to be processed from the iron powder include triiron tetroxide ($Fe_3O_4$) or diiron trioxide ($\gamma$-$Fe_2O_3$).

Finally, attempts have been made to clean the rust off of metal. For example, attempts have been made to clean steel by using a chlorine hydrocarbon solution such as a methylene chloride solution. To do so, however, the structure, such as a semiconductor or steel plate, must be immersed and then soaked in the methylene chloride solution, which may cause damage to the structure itself.

SUMMARY OF THE INVENTION

The present invention relates to a simplified method of and apparatus for processing a metal. In particular, the invention relates to a process for removing impurities from steel or iron and producing an indissoluble film of anticorrosion rust on a surface of the steel or iron powder. In addition, the invention relates to a simplified process for producing a magnetic material from iron powder.

The method of and the apparatus for processing a metal of the present invention includes the use of a mixture including chlorine hydrocarbon solution, water and a surfactant solution. The mixture is heated to produce chlorine hydrocarbon gas, water vapor and surfactant gas. This gas mixture fills a hermetically sealed processing tank in which a metal material, particularly, steel material or iron powder is disposed. The gas mixture permeates into the metal material. Accordingly, impurities in the open areas of the crystal cells of the metal material are dissolved and removed, thereby cleaning the metal. Then, an indissoluble film composed of anticorrosive rust is formed on the surface of the metal. By having cleaned the metal, formation of an indissoluble film with crystal cells having a smaller diameter and a systematic lattice is possible. These crystal cells produced in the present invention are extremely resistant to corrosion, especially more so than large diameter crystal cells.

In addition, the interior area of the processing tank of the present invention is a vacuum. This feature assists in the formation of crystal cells of relatively small diameter and a systematic lattice on the surface of the metal. As discussed above, this type of crystal cell formation is exceedingly resistant to corrosion.

In addition, with the process of the present invention, an iron material such as iron powder can be convened into a magnetic material. A particular type of magnetic material that is produced is triiron tetroxide ($Fe_3O_4$) (magnetite) or diiron trioxide ($\gamma$-$Fe_2O_3$) (maghemite).

An additional advantage occurs when steel is processed in accordance with the present invention. Specifically, the surface of the steel processed by the present invention is hardened into martensite. At the same time, an indissoluble film of magnetite is formed on the surface. Martensite is the texture of the steel which has changed and quenched; and the magnetite is a chemical compound formed on the surface. Conventionally, to produce hard martensite on the surface of steel, the steel must be heated once to a temperature between 300° and 800° C. Generally, the steel is heated to this temperature by a burning gas. However, this hard martensite surface is obtained by the process of the present invention. Particularly, the steel is exposed to chlorine hydrocarbon gas, which only needs to be heated to a temperature between 70° and 150° C. Thus, by the process of the present invention, the surface of the steel is both hardened and covered with the indissoluble film or anticorrosive rust.

BRIEF DESCRIPTION OF THE DRAWINGS

The accompanying drawings, which are incorporated in and form a part of the specification, illustrate different embodiments of the present invention and, together with the description, serve to explain the principles of the invention. In the drawings:

FIG. 2 is a chart showing the steps of the method of processing steel or iron powder as they relate to the state of the solenoid valves used in the method;

FIG. 3 is a side view of an apparatus for processing steel or iron powder in accordance with the present invention;

FIG. 4 is a side view of a processing tank shown in FIG. 3 closed by a lid;

FIG. 10A is a graph showing the results of X-ray diffraction of rust generation on a surface of iron powder processed in accordance with the invention;

FIG. 10B is another graph showing the results of X-ray diffraction of rust generation on a surface of iron powder processed in accordance with the invention;

FIG. 10C is a graph showing the results of X-ray diffraction of diiron trioxide ($Fe_2O_3$);

FIG. 10D is a graph showing the results of X-ray diffraction of triiron tetroxide ($Fe_3O_4$); and FIG. 10E is a graph showing the results of X-ray diffraction geothite (FeO(OH)).

DETAILED DESCRIPTION OF THE PREFERRED EMBODIMENTS

Figure 1:
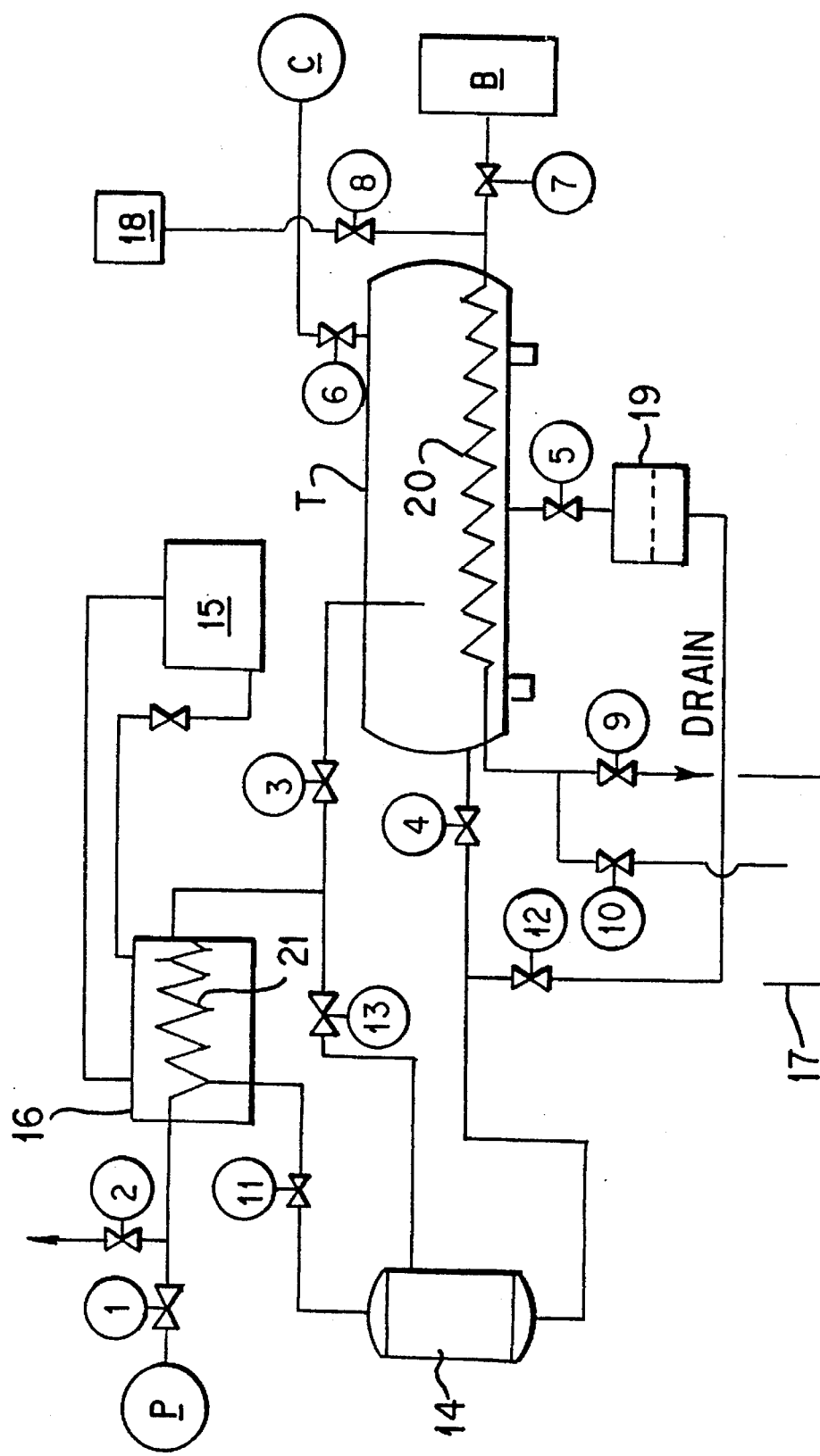
FIG. 1 is a diagram showing the basic components of the method of and apparatus for processing steel or iron powder in accordance with the present invention.
Figure 5:
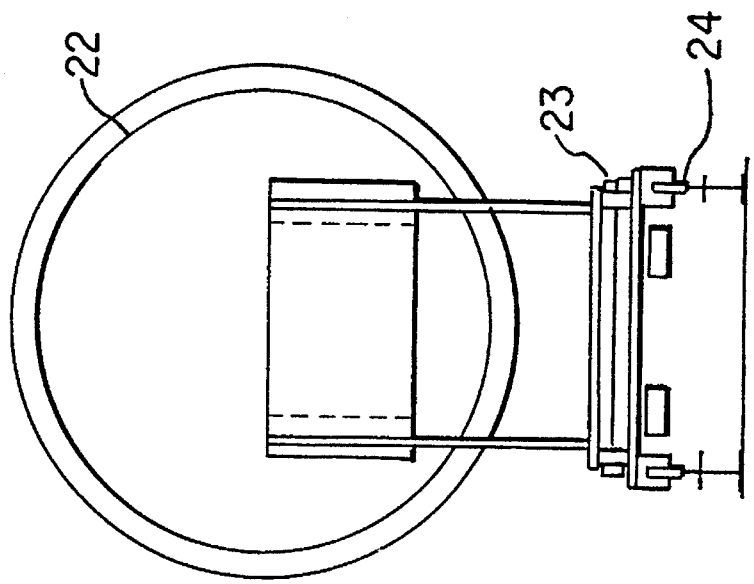
FIG. 5 is an exterior end view of the lid shown in FIG. 3.
Figure 6:
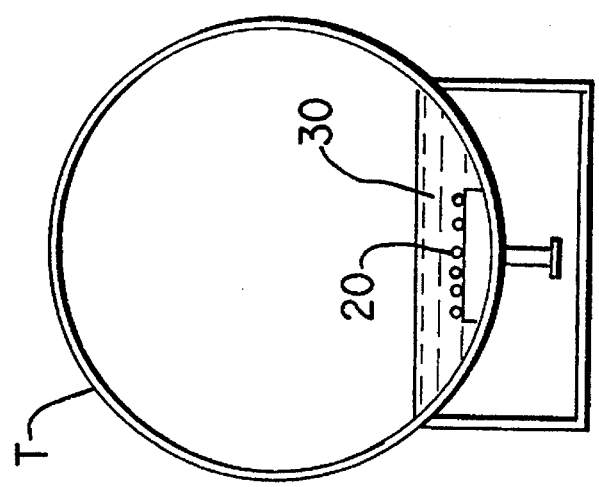
FIG. 6 is a cross-sectional view of the processing tank of the present invention taken along line 6—6 in FIG. 4.
Figure 7:
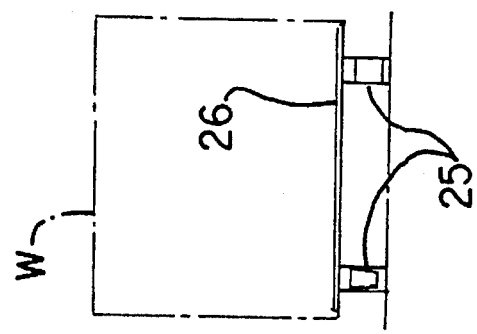
FIG. 7 is an open end view of the processing tank of the present invention and shows iron powder mounted on a mounting table for being processed in accordance with the present invention.

The invention discussed herein refers to the processing of steel or iron powder. In the process of the present invention, the steel that is to be processed may be in any structural form. For example, the steel may be in the form of a steel plate. Steel may comprise, for example, iron and other materials for strength. By processing the steel in accordance with the present invention, an indissoluble film of anticorrosion rust is formed on a surface of the steel.

In addition, iron in the form of powder can be processed by the process of the present invention. For example, the iron powder may serve as a raw material for a magnetic coating or an ingredient of anticorrosion paint. By processing the iron powder in accordance with the present invention a magnetic material is produced. Although steel and iron powder are referenced in the following discussion of the invention, the method and apparatus of the present invention will obtain similar results with other metals. For example, an indissoluble film of anticorrosion rust can be formed on aluminum or copper.

The ingredients of a fluid mixture used in the process of the present invention include methylene chloride solvent solution, water and surfactant solution. For purposes of background, methylene chloride is a substance expressed by chemical formula $CH_2Cl_2$ and has a molecular weight of 84.93. Methylene chloride is sometimes referred to as dichloromethane or methylene dichloride. The boiling point and melting point of methylene chloride are 40.4° C. and −96.8° C.

The specific type of chlorine hydrocarbon solution used is methylene chloride solvent solution. However, the use of other kinds of chlorine hydrocarbon solutions may provide equivalent results. Examples of other types of chlorine hydrocarbon solutions include trichloroethylene, tetrachloroethylene, or 111-trichloroethylene.

Surfactants are classified into anionic, cationic, nonionic and amphoteric. Anionic surfactants include alkyl sodium sulfate, amide sodium sulfate, secondary alkyl sodium sulfate, alkyl sodium sulfonate, amide sodium sulfonate, alkylallyl sodium sulfate and alkyl naphtalene sodium sulfate. Cationic surfactants include amine acetate salt, alkyl trimethyl ammonium chloride, dialkyl methyl ammonium chloride, alkyl pyridium halogenide and alkyl dimethyl benzyl ammonium chloride. Amphoteric surfactants include carboxylic acid type, sulfonic acid type, and sulfate type. Nonionic surfactants include polyoxyethylene alkylphenol, polyoxyethylene fatty alcohol, polyoxyethylene fatty acid, polyoxyethylenic acid amide, polyoxyethylenic fatty amide and polypropylene glycol.

While in one embodiment of the invention discussed herein, the mixture used for processing metal in accordance with the present invention includes water and surfactant solution added to the methylene chloride solvent solution, this combination may be altered. Alternatives to this combination include the use of chlorine hydrocarbon solution alone, or methylene chloride solvent solution alone or a mix of water and methylene chloride solvent solution.

At this time, it has been found that the best results are obtained when the mixture includes methylene chloride solvent solution, water and surfactant solution. Although chlorine hydrocarbon solution alone will remove impurities from the metal (e.g., clean the metal), the addition of water to the chlorine hydrocarbon solution reduces damage to the surface of the steel or iron powder caused by chlorine gas (as discussed below, the water serves to absorb the chlorine gas during processing). When mixing chlorine hydrocarbon solution or methylene chloride solvent solution with both water and surfactant solution, even more impurities can be removed from the steel or iron powder during the process of the present invention.

In the present method of processing steel or iron, with the increase of alkalinity of the fluid mixture, chlorine gas ($Cl_2$) is more likely to be produced during processing (e.g., chlorine gas may be produced when the fluid mixture is converted into a gas mixture). To reduce or prevent the production of chlorine gas, polyoxyethylene alkylphenol, which is a nonionic surfactant relatively stable against acid and alkali, is used. However, for purposes of the present invention any surfactant that is effective for (1) dissolution and removal of impurities from crystal cells of the steel or iron powder; (2) formation of indissoluble film on the surface of the steel or iron powder; or (3) conversion of the iron powder into magnetic material may be used.

When heating the fluid mixture of methylene chloride solution, water and surfactant solution in accordance with the present invention, gases and compounds are generated in addition to methylene chloride gas, water vapor and surfactant gas. These additional gases and compounds include HCHO, HF, HCl, HBr, $NH_3$, $Cl_2$ (in small quantities), $CH_4$, CO, $CO_2$, organic acid and organic compounds. Organic acids include phosphoric, citric, pyruvic, malic, succinic, lactic, formic, acetic, levulinic, pyroglutamic, propionic, isobutyric and isovaleric acids.

Referring to FIGS. 1, 3, 4, 5, 6, 7 and 8, an apparatus for implementing the process of the present invention is described. The apparatus includes a processing tank T, a lid 22 and a mounting table 26. Processing tank T is adapted to endure various degrees of pressure experienced in accordance with the present invention. Specifically, processing tank T is adapted to endure, for example, degrees of pressure ranging from 50 Torr during the step of deaerating the steel or iron powder (discussed below) to 200 Torr during the step of recovering the methylene chloride.

Lid 22 is disposed on a front end of processing tank T. Lid 22 is integral with a lid supporting part 23 and the combination is movable on a rail 24. Lid 22 is structurally integral with mounting table 26. Accordingly, lid 22 and mounting table 26 may be displaced on a rail 24 such that mounting table 26 may be disposed in processing tank T or removed from processing tank T.

Steel or iron powder W (FIG. 8) for being processed in accordance with the present invention is mounted on mounting table 26. When mounting table 26 is positioned in an interior area of processing tank T, lid 22 hermetically seals processing tank T and the interior area of processing tank T is put under pressure.

Heating and cooling pipes 20 are arranged in a lower portion of processing tank T. When heating is needed, steam having a temperature of about 100° C. is supplied from a boiler B (FIG. 1) to pipes 20. For cooling, water in a cool water tank 18 is supplied to pipes 20. The fluid mixture is shown generally at 30 and includes methylene chloride solvent solution, water and surfactant solution. Fluid mixture 30 may be poured into processing tank T in liquid phase or as a mixed gas, which may be prepared in a preparatory tank. In the embodiment shown in FIG. 1, fluid mixture 30 is fed into processing tank T in liquid phase.

Fluid mixture 30 is poured into processing tank T in an amount sufficient to immerse pipes 20. Then steam at a temperature of about 100° C. is fed from boiler B to pipes 20. With steam at this temperature being fed into boiler B, not only the methylene chloride solvent solution, which has a boiling point of 40° C., but also the water in fluid mixture 30 turns into vapor or steam.

However, in accordance with the present invention, the level of liquid mixture 30 in processing tank T always remains below mounting table 26 even at its highest level. Specifically, the steel or iron powder on mounting table 26 is not immersed into liquid mixture 30 at any time during the process of the present invention. The method of the present invention depends entirely on fumigation, whereby the steel or iron powder W is processed by the mixture solution gas being absorbed into the steel or iron powder W.

The basic elements of the method and apparatus of the present invention will now be described. The apparatus, pans of which were discussed above, primarily comprises processing tank T and a mixture solution tank 14. Liquid mixture 30 is disposed in tank 14. Boiler B converts liquid mixture 30 into gas, as discussed above. A compressor C operates to apply pressure such that liquid mixture 30 in processing tank T returns to tank 14 after completion of the processing of the steel or iron powder.

After liquid mixture 30 is forcibly discharged from processing tank T, vacuum pump P operates to absorb methylene chloride gas, steam, and surfactant gas remaining in processing tank T, as well as, the open areas of crystal cells of steel or iron powder W. The gas mixture contains the absorbed methylene chloride gas and thus cannot be discharged into the atmosphere. Therefore, the gas mixture is liquefied by being cooled in a condenser 16 and returned to tank 14 through a condenser pipe 21. The cool water in condenser 16 is chilled by chiller 15. A filter 19 is provided for filtering off impurities such as dust in liquid mixture 30, which was forced out of processing tank T by compressor C. Cool water tank 17 is a receptacle for the cool water that was used to liquefy the gas mixture.

Solenoid valves 1–14 are disposed in various locations. Solenoid valves 1–14 are opened and closed by an automatic control device at fixed intervals and are automatically operated in steps to achieve the process of the present invention. In particular, as shown in the first column of the chart shown in FIG. 2, the order of steps of the present invention includes, for example, "deaeration of the steel or iron powder," "feed of mixture solution," "processing of steel or iron powder," "cooling of mixture solution," "return of mixture solution to tank," "recovery of mixture solution gas," and "recovery of mixture solution in condenser."

Simultaneous to the operating of the solenoid valves, compressor C, boiler B, vacuum pump P, and chiller 15 are automatically driven and stopped. One cycle of the process of the present invention and including the steps discussed above is designed to take between 5 and 24 hours.

The chart in FIG. 2 shows the state of solenoid valves 1–14 in every step of the processing method and apparatus of the present invention. The symbol "+" indicates that the numbered solenoid valve is open and "−" indicates that the numbered solenoid valve is closed. In the step of "deaeration of the steel or iron powder", vacuum pump P is "ON" or driven. Solenoid valve 1 is open to allow communication between vacuum pump P and condenser 16; and solenoid valve 3 is open to allow communication between condenser 16 and processing tank T. Solenoid valves 2 and 4–14 are all closed. In this step, the interior area of processing tank T becomes a vacuum chamber at a pressure of about 50 Torr. Accordingly, air in the processing tank, as well as air in the open areas of the crystal cells of the steel material or iron powder W is drawn or compressed out of the open areas and processing tank.

Then, in the step of "feed of mixture solution," solenoid valve 4 is open to allow communication between processing tank T and tank 14. Solenoid valves 1–3 and 5–14 are closed. Thus, mixture solution 30 moves into processing tank T so that the level of mixture solution 30 in mixture solution tank 14 is flush with the level of mixture solution 30 in processing tank T since processing tank T and mixture solution tank 14 are arranged at approximately the same level.

In the step of "processing of steel or iron powder," solenoid valve 7 is open to allow communication between boiler B and processing tank T, and solenoid valve 9 is open to allow communication between processing tank T and a drain. Solenoid valves 1–6, 8 and 10–14 are closed. Then, high temperature steam coming from boiler B is fed to heating and cooling pipes 20 and mixture solution 30 in processing tank T is converted into methylene chloride gas, water vapor, and surfactant gas and permeates into the open areas of the crystal cells of the steel or iron powder W. In this step, processing of the steel continues for about 6 hours, and processing of iron powder W continues for approximately between 6 and 36 hours.

The step of "cooling of the mixture solution gas" is now described. In this step, a solenoid valve 8 is open allowing cool water tank 18 to communicate with processing tank T; and solenoid valve 10 is open allowing processing tank T to communicate with cool water tank 17. Solenoid valves 1–7, 9 and 11–14 are closed. Thus, cool water passes through heating and cooling pipes 20 and a temperature in the interior area of processing tank T falls below 40° C., which is the boiling point of methylene chloride, whereby both the methylene chloride gas and water vapor are returned to their liquid phase.

The step of "return of mixture solution to tank" is now described. In this step, solenoid valve 2 is open for allowing the escape of air from processing tank T. Solenoid valve 5, below processing tank T, is open. Solenoid valve 6 is open for allowing compressor C to communicate with processing tank T so as to drive compressor C. On the other hand, solenoid valve 12 is open for allowing communication between filter 19 and tank 14 and another valve 13 is open allowing for communication between tank 14 and the atmosphere via open solenoid valve 2. As a result, some degree of pressure acts on the interior area of processing tank T and the liquefied gas mixture is forcibly returned to tank 14.

The process of "recovery of mixture solution gas in tank" will be described. In this step, the vacuum pump P is open. Solenoid valve 1 is open for allowing vacuum pump P to communicate with condenser 16; and solenoid valve 3 is open for allowing condenser 3 to communicate with processing tank T. Solenoid valves 2 and 4–14 are closed. In this step, methylene chloride gas present in processing tank T and that has permeated into the open areas of the crystal cells of steel material or iron powder W is recovered by vacuum pump P. In this step, the pressure in vacuum P is reduced to approximately 200 Torr.

In the step of "recovery of mixture solution in condenser", solenoid valve 2 is open for allowing communication with the atmosphere; and solenoid valve 11 is open for allowing condenser pipe 21 to communicate with mixture solution tank 14. Hence, recovery of mixture solution 30 such as methylene chloride remaining in condenser pipe 21 of the condenser 16 can be recovered into mixture solution tank 14. A series of "recovery of mixture solution in condenser" steps are run for between 5 and 24 hours.

Figure 8:
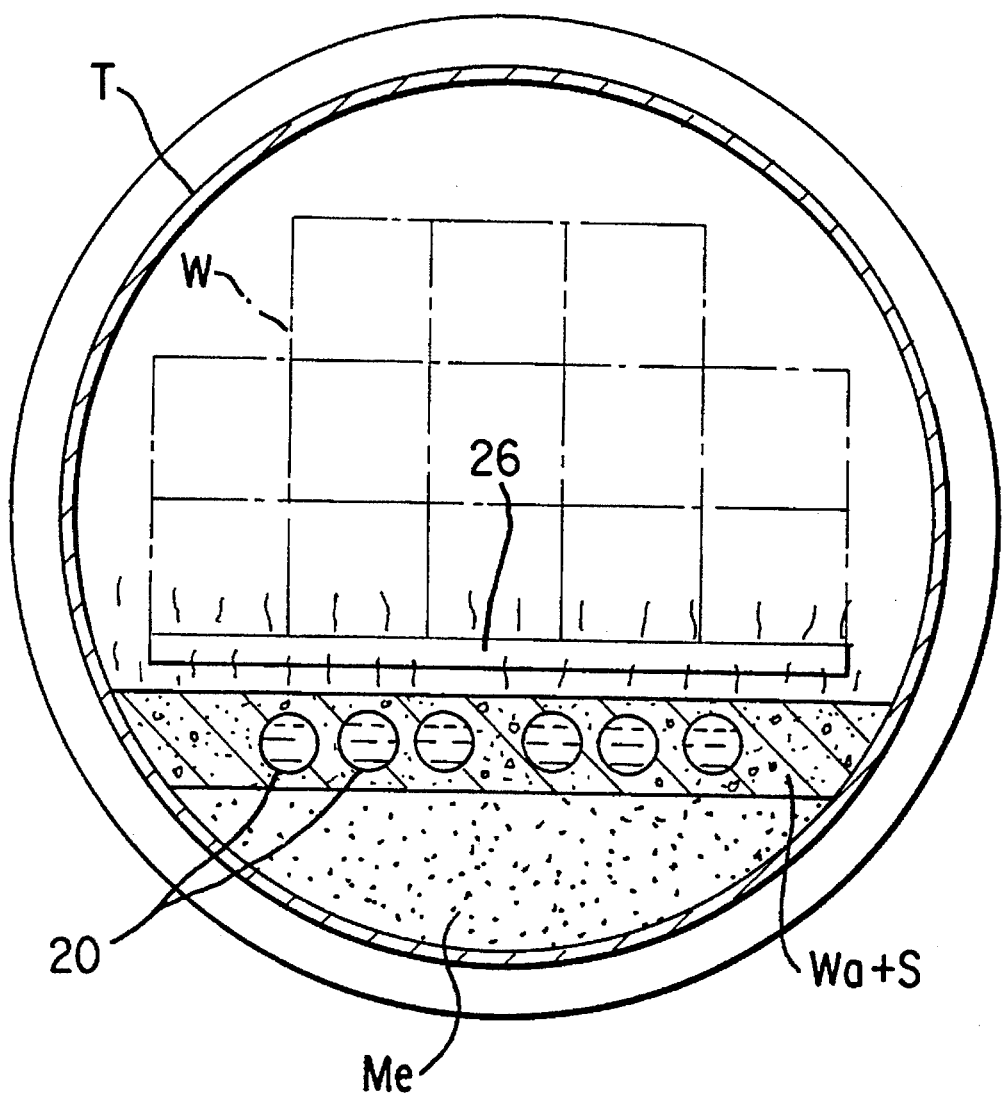
FIG. 8 is a cross-sectional view of the processing tank of the present invention during processing of the iron power and taken along line 8—8 in FIG. 4.

Referring to FIG. 8, the interior area of processing tank T during processing in accordance with the invention is now described. As discussed above, heating and cooling pipes 20 are disposed in the lower portion of processing tank T. Mounting table 26 is disposed above heating and cooling pipes 20. Steel or iron powder W is mounted on said mounting table 26. Liquid mixture 30 includes water Wa, surfactant solution S, and methylene chloride solution Me. Liquid mixture 30 is poured into processing tank T so as to immerse heating and cooling pipes 20, however, without allowing liquid mixture 30 to come in contact with the steel or iron powder W on mounting table 26.

Water Wa and surfactant solution S have a specific weight of 1.00 and 1.04, respectively, and settle at approximately the same level. Surfactant solution S dissolves in water Wa, thereby creating a top layer Wa+S of water Wa and surfactant solution S as shown in FIG. 8. In contrast, methylene chloride solution Me has a specific weight of 1.33 and is water insoluble and thus forms a bottom layer Me beneath top layer Wa+S. When steam heated to 160° C. is fed through heating and cooling pipes 20 disposed in top layer Wa+S, the temperature of pans around heating and cooling pipes 20 rises. In particular, heating and cooling pipes 20 are disposed in top layer Wa+S so that the temperature of pans near top layer Wa+S increases sooner than the temperature of the other pans not so near top layer Wa+S.

When the temperature of heating and cooling pipes 20 gradually rises and reaches about 40° C., methylene chloride solution Me is heated to reach its boiling point, turns into methylene chloride gas divided into bubbles, passes through top layer Wa+S, and reaches the steel or iron powder W so as to permeate into the open areas of the crystal cells of the steel or iron powder W.

The process continues to heat liquid mixture 30 to about 70° C. for steel, or about between 70° C. and 150° C. for iron powder W, and methylene chloride gas passes through top layer Wa+S and reaches the steel or iron powder W, as discussed above. While the methylene chloride gas passes through the top layer Wa+S, chlorine gas $Cl_2$ generated from the methylene chloride is absorbed into water Wa thereby avoiding any undesirable effects on the process. Methylene chloride gas attended with surfactant gas permeates into the open areas of the crystal cells of the steel or iron powder W. Removal of impurities is more effective with the use of the surfactant.

By preparing fluid mixture 30 containing water Wa, surfactant S, and methylene chloride Me and heating fluid mixture 30 with heating and cooling pipes 20, methylene chloride gas evaporates in processing tank T after passing through the top layer Wa+S, thereby chlorine gas $Cl_2$ is reduced. Methylene chloride gas entering the open areas of the crystal cells of the steel or iron powder W while mixed with surfactant solution S improves the effectiveness of dissolution of impurities. Moreover, the production of a large quantity of methylene chloride gas at low temperature eliminates the need for a high processing temperature in processing tank T.

Figure 9A:
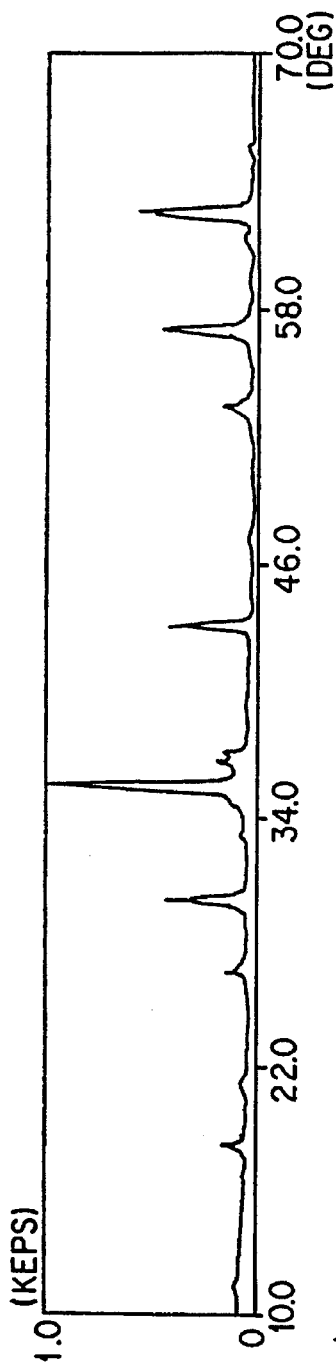
FIG. 9A is a graph showing the results of X-ray diffraction of black rust generation on a surface of iron material processed in accordance with the invention.
Figure 9B:
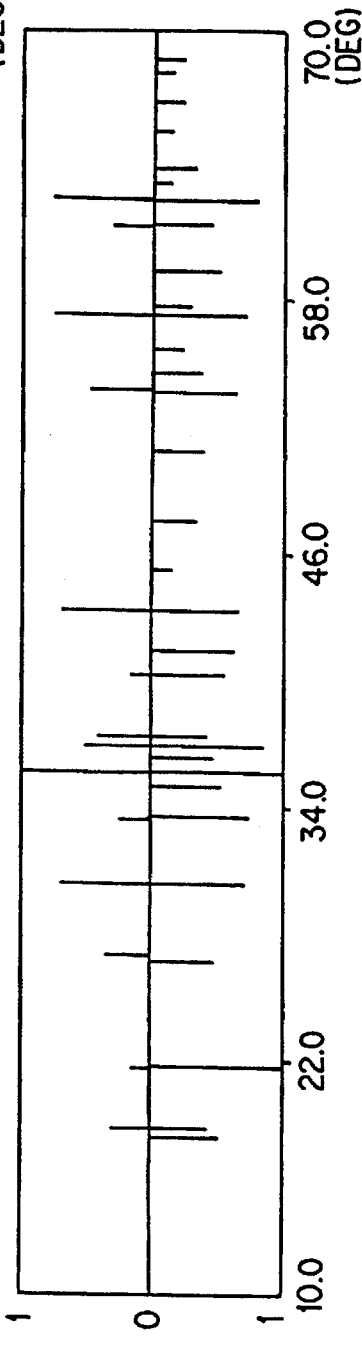
FIG. 9B is another graph showing the results of X-ray diffraction of black rust generation on a surface of iron material processed in accordance with the invention.

On a surface of the steel or iron powder W, which is processed by the above method and apparatus, a black rust is produced. This is illustrated in FIGS. 9A and 9B by the results of X-ray diffractions of a black rust sample shown in a temperature range between 10° C. and 70° C. and using a continuous scan made of θ–2θ. The black rust primarily comprises triiron tetroxide ($Fe_3O_4$), namely magnetite, in the form of an indissoluble film of noncorrosive rust or magnetic material where steel, iron or iron powder is used. In particular, magnetite, which previously had to be heated at a high temperature to be produced (discussed above), can be produced simply and at a relatively low temperature due to the present invention.

Figure 9C:
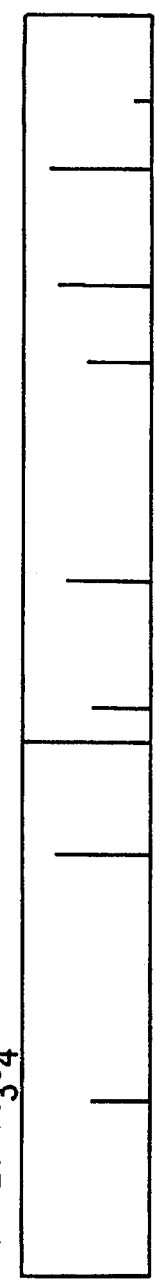
FIG. 9C is a graph showing the results of X-ray diffraction of a main component of the black rust, which is triiron tetroxide ($Fe_3O_4$)
Figure 9D:
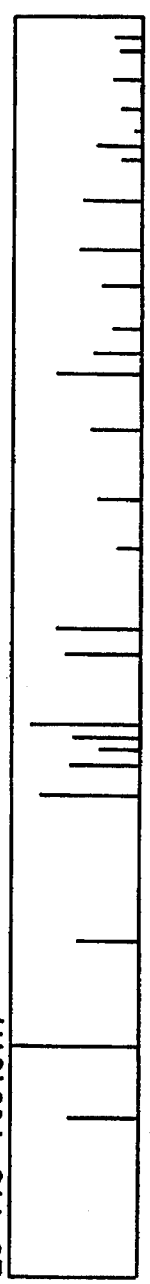
FIG. 9D is a graph showing the results of X-ray diffraction of a red rust, namely, geothite (FeO(OH))

The main component of the black rust is triiron tetroxide ($Fe_3O_4$). However, as shown (only in partial view) in FIG. 9D, geothite ($\alpha$-FeOOH), one of red rusts discussed in the background section above, is produced. Additionally, it is possible that lepidocrocite ($\gamma$-FeOOH), another one of red rusts, is also produced. However, if the processing time is prolonged, the red rusts such as geothite ($\alpha$-FeOOH) turn into triiron tetroxide ($Fe_3O_4$) gradually. Particularly in case of processing iron powder, the triiron tetroxide ($Fe_3O_4$) is initially produced on the surface of iron powder W, but gradually over time, the triiron tetroxide ($Fe_3O_4$) permeates the inner part of iron powder W so that the layer of indissoluble film becomes thicker to form a more stable indissoluble film. Finally, the triiron tetroxide ($Fe_3O_4$) enters iron powder W so that it is completely converted into triiron tetroxide ($Fe_3O_4$), namely magnetic material. An X-ray diffraction of $Fe_3O_4$ is shown in FIG. 9C.

In addition, in the present invention, the surface of the processed steel is hardened by being changed into martensite due to exposure of the steel to chlorine hydrocarbon gas, particularly methylene chloride gas heated at low temperatures between 70° and 150° C. Thus, with the present invention, the surface of the steel is hardened in addition to being covered with indissoluble rust.

Magnetic material, in particular, diiron trioxide ($\gamma$-$Fe_2O_3$), namely maghemite, which usually needs to be heated at high temperatures, can also be produced by the process of the present invention. Generally, when fine-grained iron powder is processed, it turns into powdery rust, which comprises diiron trioxide ($\gamma$-$Fe_2O_3$). See the X-ray diffractions of an iron powder sample shown in a temperature range between 10° C. and 70° C. and using a continuous scan mode of $\theta$–$2\theta$ in FIGS. 10A and 10B. However, if the iron powder is processed by the method and apparatus of the present invention, it is possible to obtain maghemite simply and at a relatively low temperature. FIGS 10C, 10D and 10E show the result of X-ray diffraction of $Fe_2O_3 Fe_3O_4$ and FeO(OH)), respectively.

In the present invention, the methylene chloride gas and steam produced from the liquid mixture of methylene chloride solvent solution and water, permeates the open areas of the crystal cells to clean impurities and debris from the metal. After the metal is cleaned, an indissoluble film is produced on the surface of the metal. If steel or iron power is being processed, the indissoluble film produced is black rust primarily composed of triiron tetroxide ($Fe_3O_4$). The particular type of triiron tetroxide produced is magnetite. Since the rust formed comprises an indissoluble film, any additional rusting is prevented. In addition, with the process of the present invention, iron powder may be converted into a magnetic material. Also, a surfactant may be included in the liquid mixture to accelerate the process of the present invention.

Since the metal is cleaned and an indissoluble film of anticorrosion rust is produced on the surface of the metal, formation of additional rust is prevented. Accordingly, the use of anticorrosion paints is reduced or eliminated with the present invention. Of course, the use of an anticorrosion paint is within the scope of the present invention to further ensure the metal's resistance to rusting.

In the present invention, the metal is processed simply by exposing the surface of the metal to the gas mixture. Therefore, the metal can be processed easily and without damage or disconfiguration of the metal. For example, a steel tube or a welded steel framework may be processed simply by disposing such product in processing tank T. Accordingly, the interior side of the steel tube and the entire surface of the steel framework are processed.

Moreover, since the processing temperatures are relatively low (between 70° C. and 150° C.), undesirable strain, modification, or chemical change to the product can be avoided. Furthermore, since the process of the present invention is performed at a relatively low temperature, the costs associated with processing the metal are reduced.

Further, the cleaning of the metal by the process of the present invention is enhanced with the use of a surfactant in the liquid mixture. For example, it is easier to remove gaseous dust from the open areas of the crystal cells of the metal. This cleaning of the metal enables the formation of an indissoluble film of anticorrosion that has crystal cells with a small diameter and a systematic lattice. These rust crystal cells produced in the present invention produce an indissoluble film that is exceedingly resistant to corrosion. Since, the surfactants speed the process of the invention, the processing time is reduced and the cost is also decreased.

Furthermore, since the interior area of the processing tank is a vacuum in the present invention, the present invention enables the crystal cells of the triiron tetroxide (rust), which form on the surface of steel to form an indissoluble film of anticorrosion rust, to have a relatively small diameter and a systematic lattice. As discussed above, this type of crystal cell formation is exceedingly resistant to corrosion.

Also, where an anticorrosion paint is made of a mixture of, for example, a plastic compound and the triiron tetroxide ($Fe_3O_4$) produced from iron powder in accordance with the present invention, when the paint mixture is painted on the surface of metal or iron additional corrosion is prevented from occurring. On the other hand, over time, the triiron tetroxide ($Fe_3O_4$) in the paint spreads and thickens thereby increasing the amount of triiron tetroxide ($Fe_3O_4$) in the paint and continually increasing the metal's resistance to corrosion.

The preferred embodiment was chosen and described in order to best explain the principles of the present invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of processing a metal, comprising the steps of:

disposing said metal in a hermetically sealed processing tank, wherein said metal has a surface and said metal comprises crystal cells having open areas;

disposing a mixture solution including a chlorine hydrocarbon solution and a water solution in said hermetically sealed processing tank; and generating a gas including a chlorine hydrocarbon gas and steam from said mixture solution such that said gas permeates into said open areas of said crystal cells of said metal so as to dissolve and remove impurities in said open areas, whereby an indissoluble film of highly anticorrosive rust is formed on said surface of said metal.

2. A method according to claim 1, wherein said metal comprises one of steel, iron and iron powder.

3. A method according to claim 1, wherein said chlorine hydrocarbon solution comprises a methylene chloride solution and said gas comprises methylene chloride gas.

4. A method according to claim 3, wherein said metal comprises one of steel, iron and iron powder.

5. A method according to claim 1, wherein said mixture solution further comprises a surfactant solution such that said gas further comprises a surfactant gas.

6. A method according to claim 5, wherein said metal comprises one of steel, iron and iron powder.

7. A method according to claim 5, further comprising the step of:

setting a mixture ratio by weight for said mixture solution, wherein said mixture solution ratio by weight for said methylene chloride solution, water solution and surfactant solution is set approximately a 5:4:1 ratio and the surfactant ratio is set at 1 or less.

8. A method according to claim 5, further comprising the step of:

setting a mixture ratio by weight for said mixture solution, and wherein said step of generating a gas comprises the step of heating said mixture solution at a temperature between 70° C. and 150° C.

9. A method according to claim 1, further comprising the step of:

deaerating said metal by creating a vacuum in an interior area of said processing tank.

10. A method according to claim 1, wherein said metal comprises an iron powder, and said method further comprises the steps of:

mixing said processed iron powder into a paint; and painting said paint on a steel surface, whereby additional indissoluble film may be generated gradually.

11. A method according to claim 1, wherein said step of disposing said metal in said hermetically sealed processing tank comprises disposing said metal apart from said mixture solution.

12. A method for producing magnetite, comprising the steps of:

disposing an iron material in a hermetically sealed processing tank;

disposing a mixture solution including a chlorine hydrocarbon solution and water solution in said hermetically sealed processing tank; and converting said iron material to magnetite by heating said mixture solution at a temperature between 70° C. and 150° C. to generate a gas including a chlorine hydrocarbon gas and steam, which permeates said iron material, thereby converting said iron material into said magnetite.

13. A method according to claim 12, wherein said chlorine hydrocarbon solution comprises a methylene chlorine solution and said hydrocarbon gas comprises methylene chloride gas.

14. A method according to claim 13, wherein said mixture solution further comprises a surfactant solution and said gas further comprises surfactant gas.

15. A method according to claim 14, further comprising the step of:

setting a mixture ratio by weight for said mixture solution, wherein said mixture solution ratio by weight for said methylene chloride solution, water solution and surfactant solution is set at approximately a 5:4:1 ratio, respectively, and the surfactant ratio is set at 1 or less.

16. A method for producing maghemite, comprising the steps of:

disposing an iron material in a hermetically sealed processing tank;

disposing a mixture solution including a chlorine hydrocarbon solution and water solution in said hermetically sealed processing tank; and converting said iron material to maghemite by heating said mixture solution to generate a gas including a chlorine hydrocarbon gas and steam, which permeates said iron material, thereby converting said iron material into said maghemite, and wherein said step of generating a gas comprises the step of heating said mixture solution at a temperature between 70° C. and 150° C.

17. A method according to claim 16, wherein said hydrocarbon solution comprises a methylene chloride solution and said chlorine hydrocarbon gas comprises a methylene chloride gas.

18. A method according to claim 17, wherein said mixture solution further comprises a surfactant solution and said gas further comprises a surfactant gas.

19. A method according to claim 18, further comprising the step of:

setting a mixture ratio by weight for said mixture solution, wherein said mixture solution ratio by weight for said methylene chloride solution, water solution and surfactant solution is set at approximately a 5:4:1 ratio, respectively, and the surfactant ratio is set at 1 or less.

20. A method of processing a metal, comprising the steps of:

disposing said metal in a hermetically sealed processing tank, wherein said metal has a surface and said metal comprises crystal cells having open areas;

generating a gas including a chlorine hydrocarbon and steam from a mixture solution including a chlorine hydrocarbon solution and a water solution in a preparatory tank;

disposing said gas in said hermetically sealed processing tank; and forming an indissoluble film of highly anticorrosive rust on said surface of said metal by allowing said gas to permeate into said open areas of said crystal cells of said metal, and wherein said step of generating a gas comprises the step of heating said mixture solution at a temperature between 70° C. and 150° C.

* * * * *